INVENTORS
R. D. BAUER
N. W. MITCHELL
BY Hudson and Young
ATTORNEYS

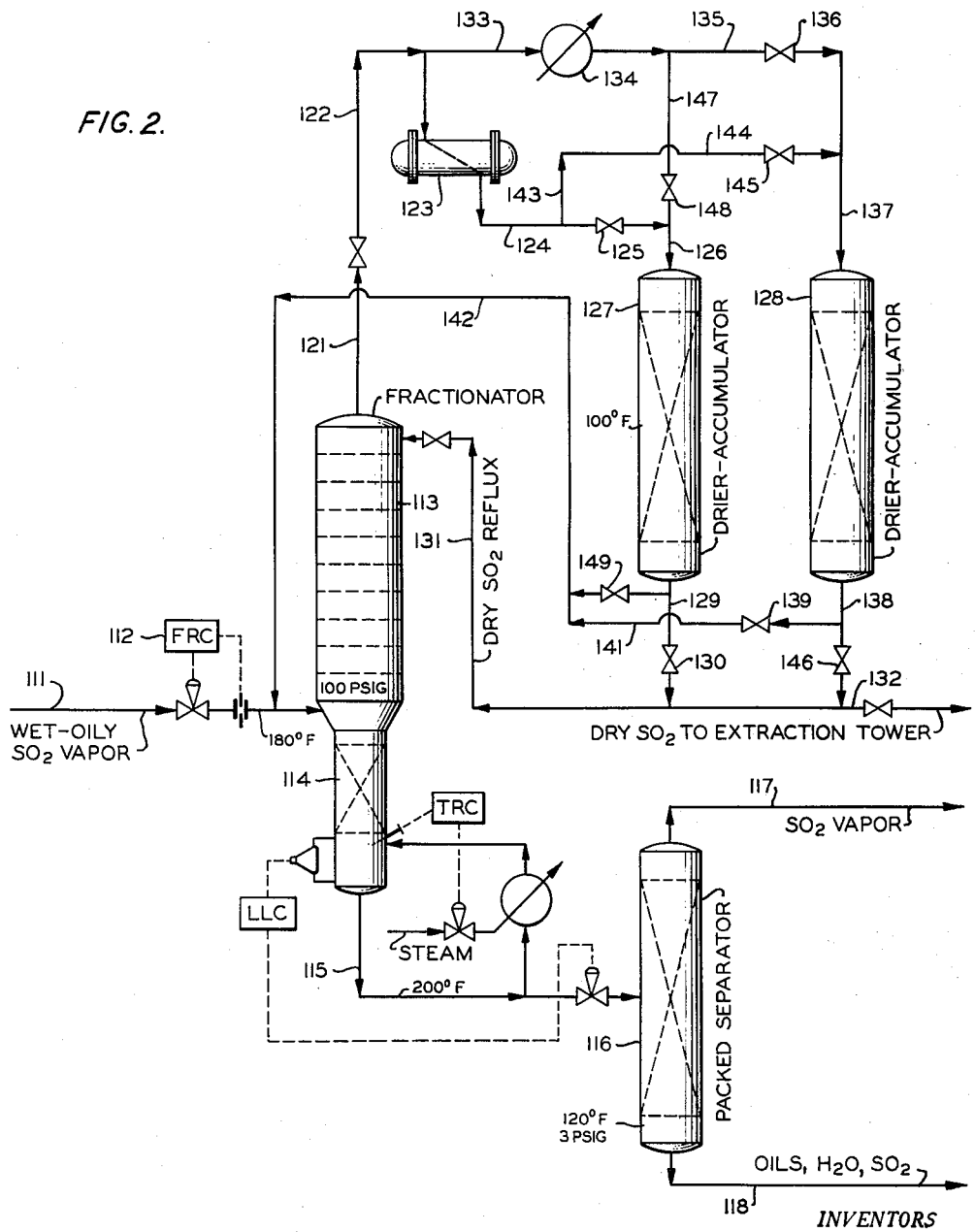

United States Patent Office 2,949,408
Patented Aug. 16, 1960

2,949,408

DISTILLATION SYSTEM

Robert D. Bauer and Norris W. Mitchell, Bartlesville, Okla., assignors to Phillips Petroleum Company, a corporation of Delaware Filed Mar. 1, 1956, Ser. No. 568,778

3 Claims. (Cl. 202—71)

This invention relates to an improved distillation means. In one aspect, this invention relates to the removal of water from the overhead product of a distillation process. In another aspect, this invention relates to a combined desiccant-drier and distillation vapor overhead product accumulator.

It is an object of the invention to provide means for drying the overhead vapors from a distillation step. It is an important object of this invention to provide a fractional separation means wherein the overhead vapor condenser accumulator is utilized also as a desiccant drier. Another important object is to provide a distillation means wherein a desiccant-drier and overhead accumulator are combined and utilized cyclically and overhead vapors are utilized to regenerate the desiccant of the drier. It is a further object of this invention to provide flexibility in a distillation process wherein moisture is present and must be removed, by provision of means to supply a dry overhead product and dry reflux to the still or a dry overhead product and a wet reflux to the still. Other objects and advantages will be apparent to one skilled in the art upon study of the disclosure of the invention.

In numerous processes such as alkylation, solvent refining, ethylene purification, etc., it is required that the overhead product recovered from a fractionation step be dry or substantially water free. This is difficult in some cases because water tends to volatilize with many water-immiscible liquids.

Broadly speaking, our invention contemplates a novel system for the recovery of a substantially dry overhead distillation product by utilizing a desiccant-drier for the reflux accumulator. The invention provides a simplified and flexible system applicable to a distillation process whereby a dry overhead product and a dry reflux stream can be obtained or if desired a dry overhead product and a wet reflux stream can be obtained. In a preferred arrangement of our system, we employ two drier-accumulator vessels so that one vessel is normally utilized in the drying cycle while the other is maintained in the regeneration cycle. A number of advantages including a simplified process and a unitary operation are secured by practicing our invention. The process is simplified in that one vessel is utilized as both a drier and an accumulator and the operation is rendered unitary by utilizing the fractionator overhead vapors for regeneration of the desiccant material. The vapors utilized for regeneration of the desiccant are returned to the system.

In the drier-accumulator vessel of our invention, we can employ any of the various known desiccants such as bauxite, activated alumina, silica gel, fuller's earth, acid treated clay, and the like. The preferred desiccant materials have a high void space, for example, bauxite has a void space of about 70 percent. Such void space in the desiccant serves to allow accumulation, and surge, of the liquid which is being dried as it passes therethrough.

In the accompanying drawing, there is shown diagrammatically two modifications of the invention which illustrate means for utilization of the combined drier-accumulator.

Figure 2 is a schematic illustration of a modification of the invention directed specifically to the production of substantially dry $SO_2$ vapors from a distillation operation.

Figure 1:
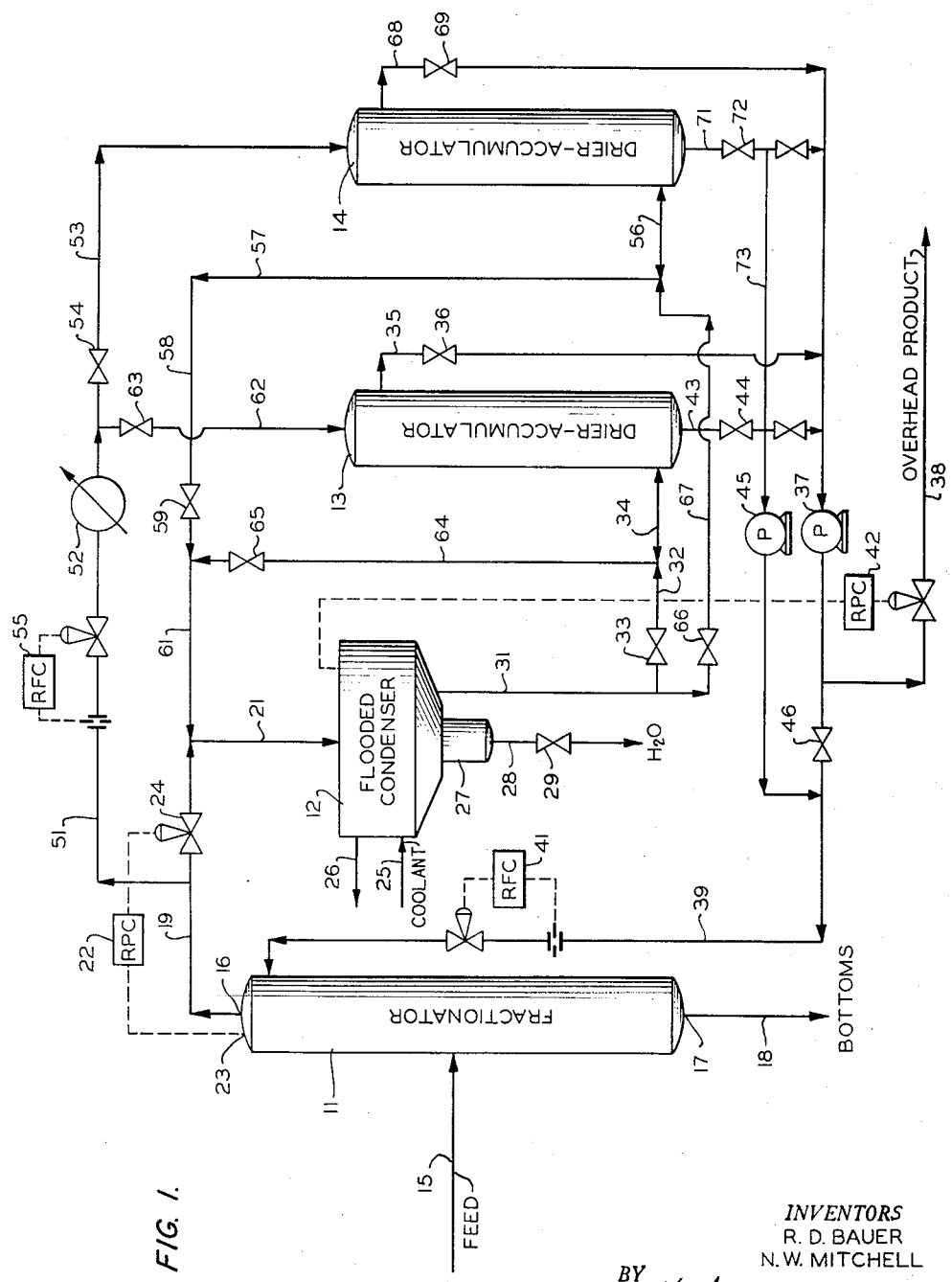
Figure 1 is a schematic illustration of one embodiment of the invention.

Referring now to the drawing and particularly to Figure 1, a fractionating column 11 is connected to a condenser 12 and drier-accumulator vessels 13 and 14. The feed to the fractionator enters through line 15 at a point between the overhead drawoff 16 and the bottoms removal 17. The bottoms product removed through line 18 can be further processed if desired. The vaporous overhead material is passed through lines 19 and 21 to the condenser 12, which is illustrated as a flooded condenser although any conventional condenser can be utilized. The flow through lines 19 and 21 is controlled by a regulating pressure controller 22 which is connected to the interior of the fractionator at line 23 and controls motor valve 24 in response to that pressure. A cooling medium is circulated through the flooded condenser 12 in indirect contact with the materials in the condenser and this coolant is introduced through line 25 and removed through line 26. Any free water which condenses and separates from the fractionator overhead product is accumulated in the water leg 27 and withdrawn through line 28 and valve 29. The operation of removing water from this water leg can be automatically controlled by a liquid level controller actuated by a float responsive to the interface of the water and the other material. This controller is not shown.

Liquid overhead product is removed from condenser 12 via conduit 31 and is passed to drier-accumulator 13 via line 32 containing valve 33 and via line 34 so that the liquid will enter the bottom of drier-accumulator 13 and traverse the bed of desiccant material with the result that substantially dry overhead products are removed from the top of vessel 13 via line 35 containing valve 36 and this dry product is passed by means of pump 37 to overhead product storage through line 38 and to fractionator 11 reflux through line 39. The reflux rate is controlled by recording flow controller 41 and the product recovery rate is controlled by recording pressure controller 42. If a dry reflux stream is not required, or desired, valve 44 in line 43 at the bottom of drier-accumulator 13 can be opened so that a portion of the stream entering vessel 13 through line 34 will be diverted through line 43 and passed by means of pump 45 to the reflux line 39. In such case, valve 46 will be closed.

During at least a portion of the time that vessel 13 is on the drying cycle, the vessel 14 will be on regeneration cycle for regeneration or drying of the desiccant material in that vessel. In such case, a portion of the overhead vapor will be diverted from overhead line 19 to line 51 through heater 52 and line 53 containing valve 54. The flow of vapor through vessel 14 is controlled by recording flow controller 55. The vapors are removed from vessel 14 via lines 56, 57, 58 (containing valve 59), 61 and 21 to condenser 12. Here the vapors are cooled and condensed and at least a portion of the moisture picked up from vessel 14 coalesces and accumulates in water leg 27. When vessel 13 is on the regeneration cycle valves 33, 44 and 36 are closed and the heated vapors are admitted through line 62 by opening valve 63. Vapors are removed through lines 34, 64 (containing valve 65), 61 and 21 to condenser 12.

During the time vessel 13 is on the regeneration cycle, vessel 14 is being used on the drying cycle and product contaminated with moisture is removed from condenser 12 through line 31, valve 66, line 67 and line 56 to the bottom of vessel 14. Substantially dry product is removed from the top of vessel 14 through line 68, valve 69, pump 37 and lines 38 and 39. If a dry recycle stream is not required, a portion of the feed entering vessel 14 is diverted from the bottom of that vessel through line 71, valve 72 and line 73 to pump 45 and thence to reflux line 39.

The operation of the system of Figure 1 has been described for manual change from drying cycle to regeneration cycle. It is contemplated that the change can be made automatically, for example, by means of a continuous analysis of the outlet of the vessel on drying cycle. A time cycle mechanism could be activated by the appearance of a predetermined amount of moisture in the outlet of the vessel on the drying cycle. The continuous analysis could be a measure of electrical conductivity or other analytical determination for moisture content. Time cycle systems are well known in the art and need not be described with further particularity at this time.

Referring now to Figure 2 wherein this invention is utilized in the recovery of dry $SO_2$ from an $SO_2$ extraction system, wherein hydrocarbons of different molecular structure are separated from each other by extraction with liquid $SO_2$, and the feed to the fractionator is admitted through line 111 at a rate determined by flow recorder controller 112 and enters fractionator 113 at a point above the packed section 114. The portion of fractionator 113 above the feed inlet can be advantageously a bubble tray type distillation column. The bottoms product from fractionator 113 is removed via line 115 to packed separator 116 where $SO_2$ vapor is taken overhead through line 117 and bottoms product comprising oils, water, and some $SO_2$ are removed via line 118. Section 114 of fractionator 113 and separator 116 are advantageously packed with contact material such as Raschig rings made of ceramic material, carbon, metal or other inert substance. The overhead vapors from fractionator 113 are passed by means of lines 121, 122, to condenser 123. The wet, condensed fractionator overhead product passes from condenser 123 through line 124, valve 125, line 126, to drier-accumulator 127. During at least a portion of the time that drier-accumulator 127 is on the drying cycle, the drier-accumulator 128 is being regenerated. The dried product is removed from the bottom of vessel 127 through line 129 and valve 130 to reflux line 131 and product line 132.

A portion of the fractionator overhead vapors is diverted from line 122 to line 133, heater 134 and line 135, valve 136 and line 137 to the top of drier-accumulator 128. Hot, wet vapors are removed from the bottom of vessel 128 via line 138, valve 139, line 141, and line 142 and returned to the fractionator feed line 111.

When vessel 127 is being regenerated and vessel 128 is on drying cycle, the liquid condensed in condenser 123 passes through line 124, line 143, line 144, valve 145 and line 137 to the top of vessel 128. Dry product is removed from the bottom of vessel 128 through line 138, valve 146 and passed through reflux line 131 to fractionator 113 and through line 132 to the extraction tower. Vapors for regeneration diverted from line 122 are passed through line 133, heater 134, line 147, and valve 148 to the top of vessel 127. Hot, wet vapors are removed from the bottom of vessel 127 through line 129, valve 149 and passed through line 142, to the fractionator feed line 111. The wet vapor obtained from regenerating the desiccant-containing accumulators can be introduced at a higher point in the still if desired or the vapor can be cooled and introduced along with the reflux.

Various routine steps of control have not been recited, however, these steps are believed obvious to one skilled in the art and include such routine operations as manipulation of valves and controllers to control temperatures and flow rates. Also, it is recognized that valves, auxiliary power sources and other elements obviously necessary for the operation of a system such as the one described here are not shown or discussed since the need for and the use of such auxiliary equipment is believed obvious to those skilled in this art.

EXAMPLE

As an example of the process of this invention, the following data presented in Table I demonstrate the operation of our invention with particular reference to Figure 2 and the removal of water from $SO_2$.

Table I

|  | Charge | | Overhead | | Bottoms | |
| --- | --- | --- | --- | --- | --- | --- |
|  | lbs./hr. | Wt. percent | lbs./hr. | Wt. percent | lbs./hr. | Wt. percent |
| $SO_2$ | 54,711.7 | 99.48 | 54,643.7 | 99.895 | 68.0 | 22.7 |
| Oil | 254.6 | 0.46 | 54.6 | 0.100 | 200.0 | 66.9 |
| $H_2O$ | 33.7 | 0.06 | 2.7 | 0.005 | 31.0 | 10.4 |
| Totals | 55,000.0 | 100.00 | 54,701.0 | 100.000 | 299.0 | 100.0 |

The pressure of the fractionating column is maintained at 100 p.s.i.g. The temperature of the feed is 180° F., the temperature of the kettle products removed from the bottom of the fractionator is 200° F. and the temperature of the materials in the packed bottoms product flash chamber is maintained at 120° F. The pressure maintained in the bottoms product flash chamber is 3 p.s.i.g.

Our invention presents a flexible system wherein the desired drying of an overhead stream for a distillation vessel can be effected continuously and wherein separate liquid accumulator vessels are not required because we utilize the desiccant containing vessel as a combination drier and liquid accumulator.

Reasonable variations and modifications are possible within the scope of the disclosure of the invention, the essence of which is an improved means for the continuous drying of overhead products of a distillation process which comprise a plurality of combined desiccant-drier and accumulator vessels whereby a vessel is utilized on the drying cycle while a vessel is being regenerated by means of the overhead vapors from the distillation step.

That which is claimed is:

1. In a distillation process wherein a moisture-containing still overhead product is condensed and recovered the improvement comprising separating any liquid water condensate and liquid product condensate into separate phases; removing liquid water; passing still overhead product condensate to at least one of a plurality of desiccant-containing zones; passing a stream of still overhead product condensate to the top of said still as reflux; recovering a stream of desiccant-containing zone effluent condensate as a product of the process; and drying desiccant-containing zones not being used to receive still overhead product condensate with heated still overhead product vapors.

2. The process of claim 1 wherein the stream of still overhead product condensate passed to the still as reflux by-passes the desiccant-containing zone.

3. The process of claim 1 wherein the stream of still overhead product condensate passed to the still as reflux is a portion of the desiccant-containing zone effluent condensate stream.

References Cited in the file of this patent

UNITED STATES PATENTS

| 1,184,926 | Collett | May 30, 1916 |
| 1,985,204 | Derr et al. | Dec. 18, 1934 |
| 2,031,669 | Reich | Feb. 25, 1936 |
| 2,142,726 | Hetzer | Jan. 3, 1938 |
| 2,370,530 | Gage | Feb. 27, 1945 |
| 2,440,784 | Perdew | May 4, 1948 |
| 2,514,294 | Rupp | July 4, 1950 |
| 2,645,608 | Linn et al. | July 14, 1953 |